US007954421B2

(12) United States Patent
Buschbeck et al.

(10) Patent No.: US 7,954,421 B2
(45) Date of Patent: Jun. 7, 2011

(54) LIGHTWEIGHT PISTON

(75) Inventors: Ralf Buschbeck, Mockmuhl (DE); Johannes Sperman, Bad Wimpfen (DE); Albert Haberl, Bad Friedrichshall (DE); Klaus Lormes, Bad Wimpfen (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 366 days.

(21) Appl. No.: 12/065,421

(22) PCT Filed: Aug. 26, 2006

(86) PCT No.: PCT/EP2006/008386

§ 371 (c)(1), (2), (4) Date: Jun. 5, 2008

(87) PCT Pub. No.: WO2007/025686

PCT Pub. Date: Mar. 8, 2007

(65) Prior Publication Data

US 2008/0264247 A1 Oct. 30, 2008

(30) Foreign Application Priority Data

Aug. 29, 2005 (DE) ......................... 10 2005 041 001
Aug. 29, 2005 (DE) ......................... 10 2005 041 002

(51) Int. Cl.
*F16J 1/04* (2006.01)
*F01B 31/10* (2006.01)

(52) U.S. Cl. ............................................ 92/238; 92/160

(58) Field of Classification Search .................... 92/160, 92/208, 237, 238, 239
See application file for complete search history.

(56) References Cited

U.S. PATENT DOCUMENTS 3,515,035 A 6/1970 Cuddon-Fletcher
4,989,559 A * 2/1991 Fletcher-Jones ................ 92/190
6,862,977 B2 * 3/2005 Glinsner et al. ................ 92/208

FOREIGN PATENT DOCUMENTS

DE 19918328 10/1999
DE 10145589 4/2003
EP 1348859 10/2003
JP 200179398 6/2000
JP 2001295696 10/2001
JP 2001295697 10/2001

OTHER PUBLICATIONS

International Search Report dated Nov. 30, 2006.
Preliminary International Opinion on Patentability.
English translation of the previously cited German language International Preliminary Report on Patentability.

* cited by examiner

*Primary Examiner* — Michael Leslie
(74) *Attorney, Agent, or Firm* — Young, Basile, Henlon & MacFarlane P.C.

(57) ABSTRACT

A piston has a piston head that is provided with a field of rings and a piston shaft which is disposed thereupon. The piston shaft is equipped with supporting shaft wall sections and rear connecting walls which interconnect the shaft wall sections, have an arched shape, and are fitted with a bolt bore. An undercut free space is provided below the annular field in the area of the bolt bore in the region of the piston head. An arched zone is disposed in the interior of the piston at the transition from the bolt bore in the direction of the shaft wall session.

10 Claims, 3 Drawing Sheets

LIGHTWEIGHT PISTON

BACKGROUND

The invention relates to a piston having a piston head provided with a field of rings and a piston shaft which is disposed thereupon.

A piston of this type is known from DE 101 45 589 A1. The piston has a piston head which consists of a field of rings with several ring grooves and, where applicable, a piston head combustion chamber. A piston shaft is disposed below the piston head in the direction of the motion of the piston. The piston shaft consists of two shaft wall sections supporting the piston during operation of the internal combustion engine which serve to guide the piston in the internal combustion engine cylinder. The shaft wall sections are connected to each other by rear connecting walls, where the connecting walls are not connected to the running surface of the cylinder. In the case of the piston from DE 101 45 589 A1, the connecting walls have an arched shape which may be convex, concave or consist of a combination of these arched shapes. Furthermore, in the case of this known piston, the lower edge of the field of rings in the area of the connecting walls is configured to project beyond said field of rings (excess) and is at least partially hollowed out there, so that an free space is created with the goal of saving weight.

It would be desirable to improve a generic piston with respect to its properties during internal combustion engine operation, specifically to increase its strength and long-term durability.

SUMMARY

An arched zone is provided in the interior of the piston at the transition from the bolt bore in the direction of the shaft wall section. As a result of these arched zones at the transition from the outer edge of the bolt bore in the direction of the direction of the shaft wall sections, sufficient material can remain so that the required strength is achieved at this area during piston operation, while at the same time, enough material can be removed resulting in simultaneous weight reduction and improved durability. As a result of this arched shape in the interior of the piston, in conjunction with the external arched shape of the supporting shaft wall sections, the required strength and durability of the piston is increased while piston weight is reduced at the same time. Furthermore, starting from an annular groove in the field of rings, this design can be expanded with the intention of introducing at least one interconnection into the piston in the direction of the bolt bore. This considerably improves piston operation since the oil ring sitting in the annular groove (a multi-piece oil scraper ring, as the case may be) collects the oil present on the surface of the piston or on the surface of the cylinder wall. The oil is squeezed into the interconnection and can thus be taken in the direction of the bolt bore to provide lubrication for the bolt inserted into the bolt bore. This interconnection is particularly advantageous in the case of the generic piston since the piston already has low weight and improved strength because of the arched connecting walls, where the interconnection for lubricating the bolt inserted into the bolt bore substantially improves the durability of the entire arrangement consisting of piston, bolt and connecting rod. As a result of bringing oil from the direction of the surface of the piston in the direction of the bolt bore, the bolt inserted there is lubricated and cannot seize. The bore is either cast in and/or introduced by a drilling procedure (boring).

In one aspect of the piston, at least one rib is located in the free space behind the field of rings to support the field of rings. The effect of the at least one rib is advantageously to provide effective support for the projecting area of the field of rings in the area of the rear connecting walls so that deformation of the piston during operation is reduced as far as possible.

In a further aspect of the piston, there is a rib on the right and on the left above the bolt bore in the free space. Consequently, the field of rings is supported on those areas on the right and left of the bolt bore which provide particular rigidity. As a result, effects from the movement of the bolt in the bolt bore during the motion of the piston are not transmitted to the field of rings when, in accordance with the invention, a rib is located on the right and on the left above the bolt bore.

In a further aspect of the piston, the interconnection passes through the at least one rib, specifically through several or all of the ribs. In this aspect, the ribs as well as the interconnections can be taken into consideration during the manufacture of a piston blank. As a complement or as an alternative, it is conceivable that the at least one interconnection is not introduced until after the piston blank is manufactured. It is also conceivable, for example, in the case of an angled or rounded shape for the interconnection from the ring groove in the direction of the bolt bore, for one part of the interconnection to be formed when the piston blank is manufactured and to introduce a further, remaining part of the interconnection through a later machining procedure, specifically drilling. If the interconnection is created at the time of piston blank manufacture, there is the opportunity to provide a core or a pin in the area of the later interconnection which is removed after the piston blank is manufactured.

In a further aspect of the piston, there is at least one drainage slot in the ring groove extending into the free space. The free space is shaped with the manufacture of the piston blank (and if necessary following subsequent additional machining), such that when the ring groove, in particular the lowest ring groove, is introduced, an interconnection from outside is created in the direction of the free space which forms said drainage slot extending into the free space. This means that with the introduction of the ring groove, specifically by means of a metal-removing machining step, the drainage slot is created automatically. The effect of the drainage slot which has been introduced is that the oil present on the surface of the piston or on the surface of the surface of the cylinder inner wall is removed in the direction of the interior of the piston. The effect of the position, or design layout, of this drainage slot is to increase durability in comparison with previously known oil passages. In addition, the ring contact surface is uninterrupted so that groove wear and oil consumption are reduced as a result.

In a further aspect of the piston, the bolt bore has a draft groove for a retaining ring (snap ring) for the bolt, where the draft groove is disposed below the open space and at the upper apex of the bolt bore. As the result of the free space, it becomes possible to locate the draft groove at the upper apex of the bolt bore. This has the advantage that the draft groove is located in an area in which the strength of the piston is not compromised. This results advantageously in increased safety against inertial forces.

In a further aspect of the piston, the edge below the field of rings in the area of the rear connecting walls is rounded. After the piston blank is manufactured, the blank is normally finish machined by means of metal-removing machining, specifically by turning. The result is that the edge below the field of rings in the area of the rear connecting walls is very sharp and may have a flash which can result in injuries to the assembly line workers while handling it, particularly during installation of the piston. To this end, this sharp edge is advantageously rounded below the field of rings, or possesses a rounded edge. This rounded edge can also be produced by metal-removing machining, specifically a milling operation.

BRIEF DESCRIPTION OF THE DRAWING

Aspects of the piston, to which it is not restricted, are described in the following description and explained using the Figures in which.

DETAILED DESCRIPTION

Figure 1B:
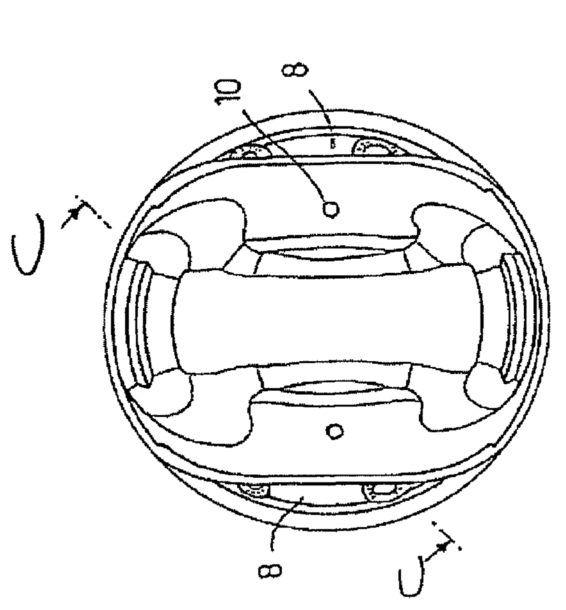
FIG. 1B is a bottom elevational view of the piston in FIG. 1A.
Figure 1C:
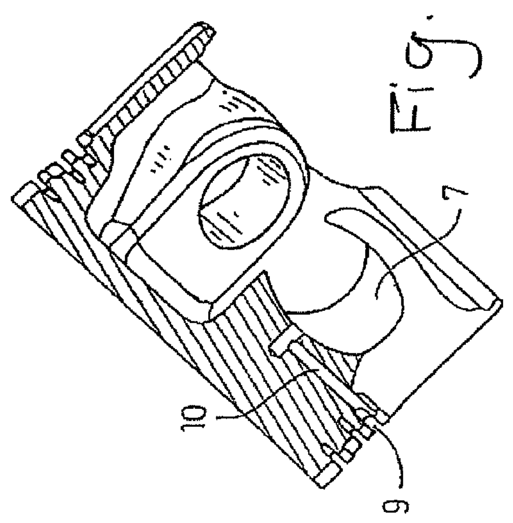
FIG. 1C is a cross section view generally taken along line CC in FIG. 1A.
Figure 1A:
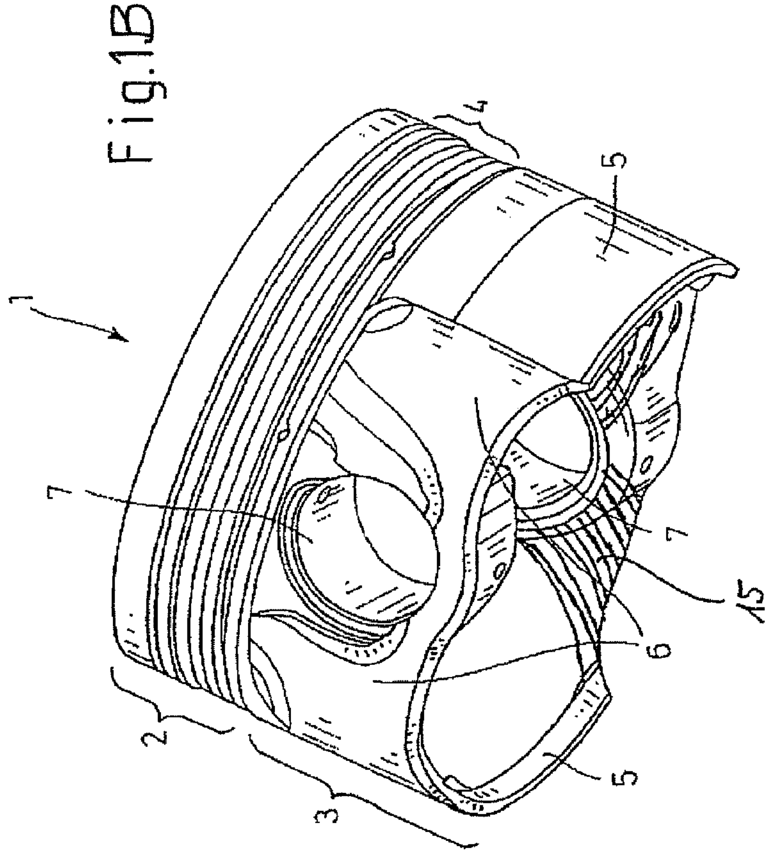
FIG. 1A is a perspective view of one aspect of a piston.

FIGS. 1A, 1B and 1C each show a piston 1 for an internal combustion engine which can be, but does have to be, configured as a lightweight piston. If a lightweight piston is involved, a piston blank is first cast from a lightweight material, specifically aluminum, and then finish machined by means of metal-removing machining. This piston 1 consists of a piston head 2 with an appended piston shaft 3, where piston head 2 and piston shaft 3 are configured as one piece or consist of two parts which are joined after they are manufactured. Furthermore, the piston 1 has a field of rings 4 with normally three ring grooves. The piston shaft 3 consists of shaft wall sections 5 carrying the piston 1, where the shaft wall sections 5 are connected by rear connecting walls 6. The connecting walls 6 have a straight, arched or other shape, wherein reference is made to the possible shapes in accordance with of DE 101 45 589 A1 with respect to the arched shape of the connecting walls 6. Reference is made to this arched zone (concave and/or convex from one shaft wall section to the other shaft wall section and/or in its direction in the axis of piston motion) since this shape assists with respect to weight savings while simultaneously retaining the strength required. Straight connecting walls can be equally important depending on the geometric design and intended use of the piston 1. The rear connecting walls 6 further have a bolt bore 7 to accommodate a bolt to connect the piston 1 to a connecting rod (not shown). It is further shown in FIGS. 1B and 1C that in the area of the piston head 2 recessed behind the field of rings 4 and above the bolt bore 7 there is a free space 8. In a first aspect, as shown in FIGS. 1B and 1C, starting from a ring groove 9 of the field of rings 4, an interconnection 10 runs in the direction of the bolt bore 7 to lubricate the bolt located there (not shown). In the aspect of the interconnection 10 in accordance with FIG. 1C, the interconnection 10 is a bore which is introduced partly from the direction of the ring groove 9 and partly from the direction of the piston shaft 3 in the direction of the piston head 2.

Figure 2B:
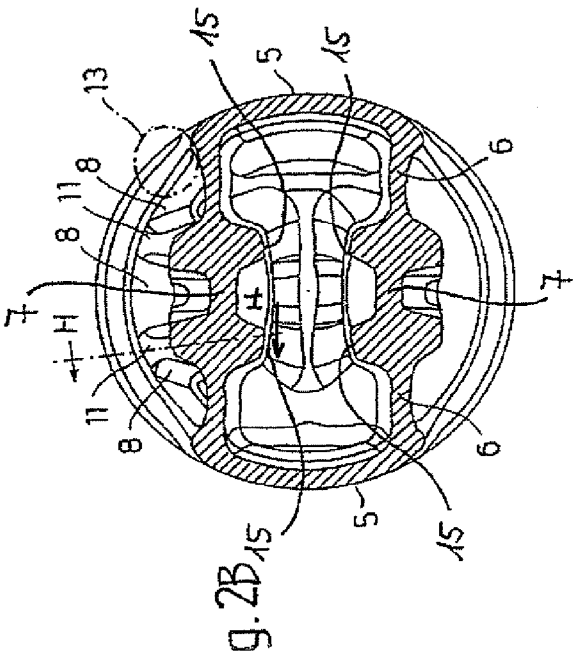
FIG. 2B is a bottom elevational view of the piston in FIG. 2A.
Figure 2C:
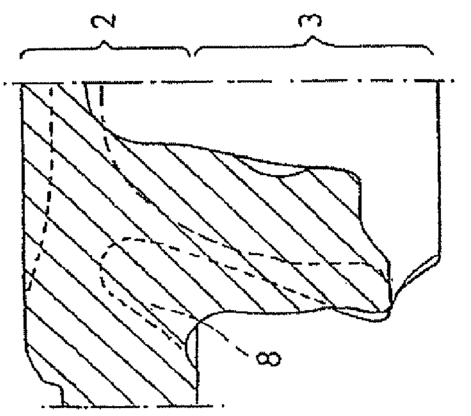
FIG. 2C is a cross sectional view generally taken along line H-H in FIG. 2A.
Figure 2A:
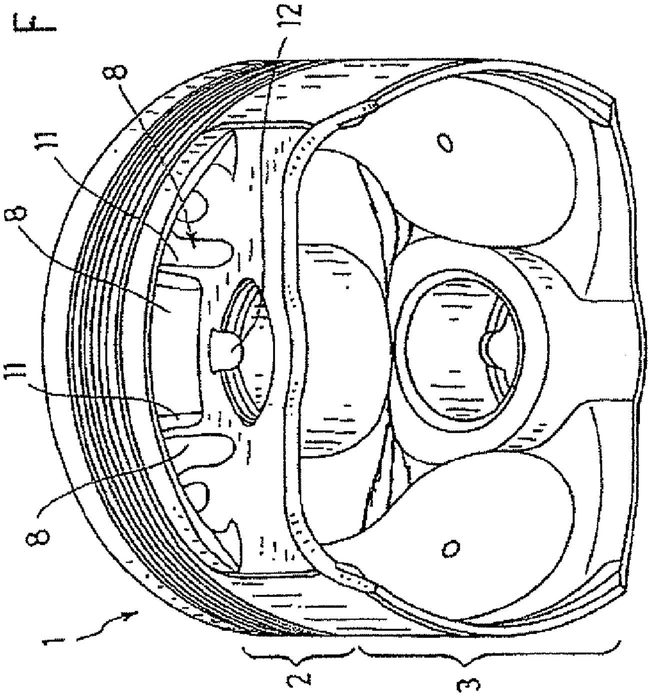
FIG. 2A is a perspective view of a second aspect of a piston.

FIGS. 2A, 2B, and 2C show the same piston 1 as in FIG. 1A, where here a rib 11 is located above the bolt bore 7 in the free space 8 to the right and to the left of the bolt bore 7. These ribs 11 serve to support the field of rings 4 during operation of the piston 1 so that the forces acting on the piston head 2 above the ribs 11 are transferred into the rear connecting walls 6. Furthermore, FIGS. 2A and 2B show that the bolt bore 7 has a draft groove 12 for a retaining ring (snap ring) for the bolt, where the draft groove 12 is located below the open space 8 and at the upper apex of the bolt bore 7. A drainage slot 13 is shown on the right in FIGS. 2A and 2B, whose position and layout can be seen when looking at FIGS. 3A and 3B. The drainage slot 13 is disposed in the area of the ring groove 9 so that an interconnection from the ring groove 9 into the free space 8 results when the ring groove 9 is introduced into the piston blank. The area of the drainage slot 13 behind the ring groove 9, meaning in the area of the free space 8, can be cup-shaped. When using specifically a three-part oil ring in the ring groove 9, oil can be taken by way of the drainage slot 13 from the surface of the piston 1 or the cylinder barrel in the direction of the interior of the piston 1. To this end, the drainage slots 13 are disposed in the area of the rear connecting walls 6, in particular one drainage slot is disposed to the right and left of the bolt bore 7, specifically symmetrically, since sufficient space is available there for the oil that has been led away Not shown in all of the Figures, the interconnection 10, as shown for example in FIG. 1C, can run through the rib 11 in the direction of the bolt bore 7, starting from the ring groove 9.

Figure 3C:
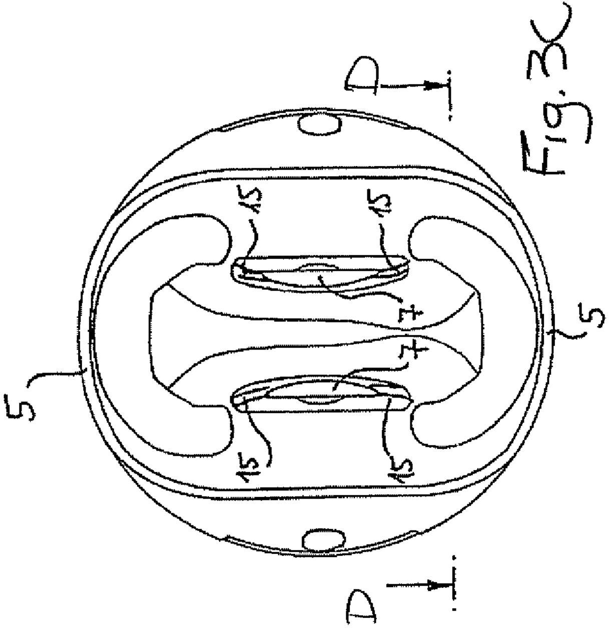
FIG. 3C is a bottom elevational view of the piston in FIG. 3A.
Figure 3D:
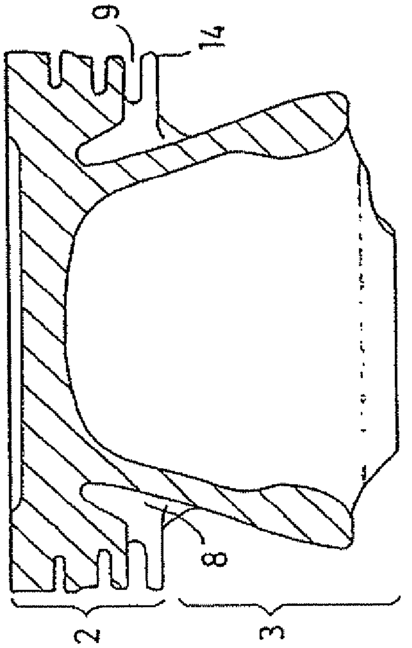
FIG. 3D is a cross sectional view generally taken along line D-D in FIG. 3C.
Figure 3A:
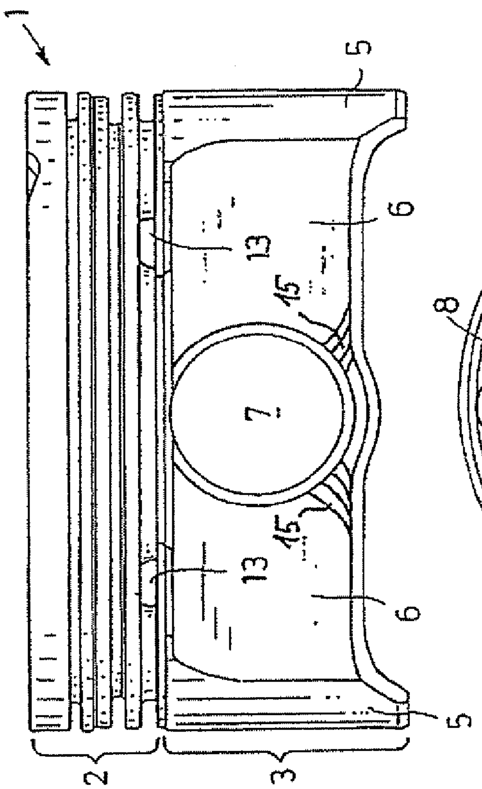
FIG. 3A is a side elevational view of a third aspect of a piston.
Figure 3B:
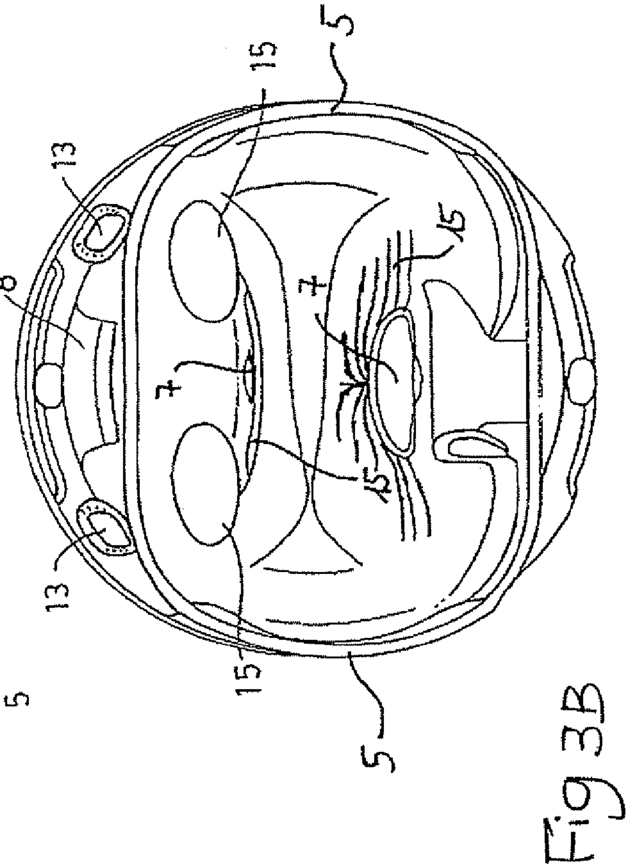
FIG. 3B is a bottom perspective view of the piston in FIG. 3A.

With a view to FIGS. 3A, 3B and 3C, it can be seen that in the interior of the piston 1 arched zones 15 are provided which, starting from the bolt bore 7, extend in the direction of the shaft wall sections 5 (their interior surfaces). These arched zones 15 can have a constant or inconstant shape in the circumferential direction and/or as they progress in the direction of the piston stroke axis and are thus adapted to the particular geometries of the interior of the piston 1. These arched zones 15 can be introduced either by casting the piston 1 or by subsequent machining, specifically metal-working machining by means of milling.

The shape and/or the extension of the arched zone 15 has the additional advantage that a free space is created in the interior of the piston which is needed for the required play of a trapezoidal connecting rod by which the piston can be connected to the crankshaft.

What is claimed is:

1. A piston having a piston head with a field of rings and a piston shaft located thereupon, further having supporting shaft wall sections and rear connecting walls which connect the shaft wall sections to each other as well as to a bolt bore, the piston comprising;

an arched zone provided in the interior of the piston at a transition from the bolt bore in the direction of the shaft wall section, wherein the arched zone exists around the entire bolt bore.

2. The piston of claim 1, wherein at least one interconnection is introduced into the piston, starting from a ring groove of the field of rings in the direction of the bolt bore.

3. The piston of claim 2, wherein at least one rib is located in a space to support the field of rings.

4. The piston of claim 3, wherein one rib is located on a right and on a left of the free space above the bolt bore.

5. The piston of claim 3, wherein the interconnection runs through the at least one rib.

6. The piston of claim 3, wherein at least one drainage slot extends into the free space in the ring groove.

7. The piston of claim 1 wherein an edge below the field of rings is rounded in the area of the rear connecting walls.

8. The piston of claim 1 wherein the shaft wall sections have an arched shape.

9. The piston of claim 1 wherein an undercut free space is formed in the area of the piston head below the field of rings in the area of the bolt bore.

10. A piston having a piston head with a field of rings and a piston shaft located thereupon, further having supporting shaft wall sections and rear connecting walls which connect the shaft wall sections to each other as to well as to a bolt bore, the piston comprising:

an arched zone provided in the interior of the piston at a transition from the bolt bore in the direction of the shaft wall section, at least one interconnection is introduced into the piston, starting from a ring groove of the field of rings in the direction of the bolt bore;

at least one rib is located in a space to support the field of ring; and the bolt bore having a draft groove for a retaining ring, the draft groove located below the open free space and at an upper apex of the bolt bore.

* * * * *